United States Patent [19]

DeKock

[11] Patent Number: 5,372,223
[45] Date of Patent: Dec. 13, 1994

[54] TWIN-PIPE SHOCK ABSORBER

[75] Inventor: Cornelis DeKock, Oud-Beijerland, Netherlands

[73] Assignee: Koni B.V., Oud-Beijerland, Netherlands

[21] Appl. No.: 866,174

[22] PCT Filed: Dec. 11, 1991

[86] PCT No.: PCT/NL91/00260
§ 371 Date: Aug. 26, 1992
§ 102(e) Date: Aug. 26, 1992

[87] PCT Pub. No.: WO92/12359
PCT Pub. Date: Jul. 23, 1992

[30] Foreign Application Priority Data

Dec. 27, 1990 [NL] Netherlands ............ 9002878

[51] Int. Cl.$^5$ ............................................. F16F 9/46
[52] U.S. Cl. ........................... 188/285; 188/299; 188/322.15; 188/322.14
[58] Field of Search ................ 188/280–282, 188/285, 299, 314–320, 322.14, 322.15, 322.22; 267/127, 218; 280/707, 714

[56] References Cited

U.S. PATENT DOCUMENTS 5,201,389  4/1993  Miller et al. ............ 188/319 X

FOREIGN PATENT DOCUMENTS 2006403 12/1969  France ............ 188/317
2596124  9/1987  France .
1229789 12/1966  Germany .
2159604 12/1985  United Kingdom .
8909891 10/1989  WIPO ............ 188/322.14

Primary Examiner—Josie A. Ballato
Attorney, Agent, or Firm—Robert P. Seitter; J. Gordon Lewis

[57] ABSTRACT

A piston in cylinder shock absorber having a hollow piston rod attached to the piston and a central pipe extending within the piston rod and piston receiving limited flow upon stroking of the piston. A first damper valve creates a variable flow resistance from a reservoir when the piston moves outwardly and a second damper valve creates a variable flow resistance of flow through the piston when the piston is displaced inwardly. A regulating mechanism controls each damper valve by control over the limited flow through the central pipe including an electrically operated servo valve varying outflow from the central pipe to the reservoir.

18 Claims, 3 Drawing Sheets

TWIN-PIPE SHOCK ABSORBER

BACKGROUND OF THE INVENTION

The invention relates to a twin-pipe shock absorber, of a known type including an oil reservoir between a working cylinder and an outer pipe, a piston which is displaceable in the working cylinder, and one or more bores provided in the piston which form the connection between the spaces above and below the piston.

A non-return upflow valve is provided which can open these bores on the inward stroke of the piston rod for the displacement of oil from the space below the piston to the space above the piston. A hollow piston rod extends towards the top end of the working cylinder. A bottom plate closes the bottom end of the shock absorber, and a disc is fitted between the piston and the bottom plate inside the working cylinder, provided with one or more bores. A non-return upflow valve regulates the upgoing flow through the bores in the disc. A central pipe extends through the piston in the hollow piston rod and also through the disc. A regulated first damper valve is fitted at the bottom end of the working cylinder, and a regulating mechanism is disposed below the first damper valve in order to regulate the flow resistance caused by the above-mentioned first damper valve.

Such a shock absorber is known from international patent application No. PCT/NL 89/00016 in the name of Koni B.V.

The main advantages of this known type of shock absorber are that the shock absorption is essentially independent of the piston speed and that a single regulating mechanism regulates the damping on the ingoing and outgoing stroke. A disadvantage is, however, that the full stroke volume of absorber fluid has to be displaced through the central pipe to the damper valve working in one direction which handles both the damping of the outgoing and of the ingoing stroke. At each stroke a large part of the cylinder contents flows to the reservoir and back. In particular, flowing back in the correct manner limits the maximum achievable piston speed at which the shock absorber still functions in the optimum way, while the dimensions of the piston and the piston rod are also subject to limitations.

The object of the invention is to avoid these disadvantages and to provide a shock absorber of the type mentioned above which still functions well at very high piston speeds, and where no limitations need to be imposed as regards the dimensions of the piston and piston rod.

SUMMARY OF THE INVENTION

According to the invention, a twin-pipe shock absorber of the general type described has a first damper valve fitted at the bottom end of the working cylinder which functions only to dampen on the inward stroke of the piston rod. A regulated second damper valve is fitted in the piston for the purpose of damping the outward stroke of the piston rod, and the regulating pressure for the second damper valve is governed via the central pipe of low cross-sectional area by the above-mentioned regulating mechanism.

This design can be made relatively small using miscellaneous standard dimensions and parts.

The regulating mechanism can be in different forms. It is preferably a servomechanism with a relay piston fitted in an exciting chamber which is provided with a connecting aperture to the oil reservoir, the passage of which aperture is determined by the electro-magnetically regulated position of the valve body of a servo valve, while the central pipe is connected to the exciting chamber at its bottom end by means of a narrow bore in the relay piston of the servomechanism.

As a result of the connection of the bottom end of the central pipe to the relay piston of the servomechanism, the guidance of the pipe is relieved of lateral forces, and the relay piston is guided better and protected against tilting.

The valve body of the servo valve is preferably connected to a coil which can be moved up and down and which is situated inside an axial permanent magnet, with electrical cables and connections connecting the coil to a control unit which regulates the electric current to the coil in correspondence with a measured control parameter.

In order to be able to excite the coil in a simple manner, the valve body of the servo valve is urged upwards through leaf springs which also form part of the electric connection to the coil.

Different embodiments are possible for the second damper valve fitted in the piston. In a preferred embodiment, the second damper valve comprises a slide displaceable in a cylindrical chamber in the piston. Side channels in the wall of the cylindrical chamber are adapted to connect the space above the downward moved slide to the space below the piston. The piston has one or more holes forming a connection between the space above the piston and slide, and the slide has one or more bores forming a connection between the spaces above and below the slide, and the space below the slide is connected to the central pipe by means of one or more radial bores in the piston rod and the space between the hollow piston rod and the central pipe.

In a variant, the above-mentioned second damper valve comprises a separate valve fitted on a slide, which slide is displaceably fitted in a cylindrical chamber in the piston, while one or more side channels are fitted in the wall of the cylindrical chamber, the channels permanently connecting the space below the damper valve to the space below the piston. The piston has one or more holes forming a connection between the space above the piston and the damper valve, while the space below the slide is permanently connected to the central pipe by means of one or more radial bores in the piston rod via the space between the hollow piston rod and the central pipe.

The valve body of the first damper valve can be designed in the form of pre-tensioned spring steel discs whose pre-tensioning is determined by the relay piston.

The invention will now be explained in greater detail with reference to the Figures.

DETAILED DESCRIPTION

Figure 1:
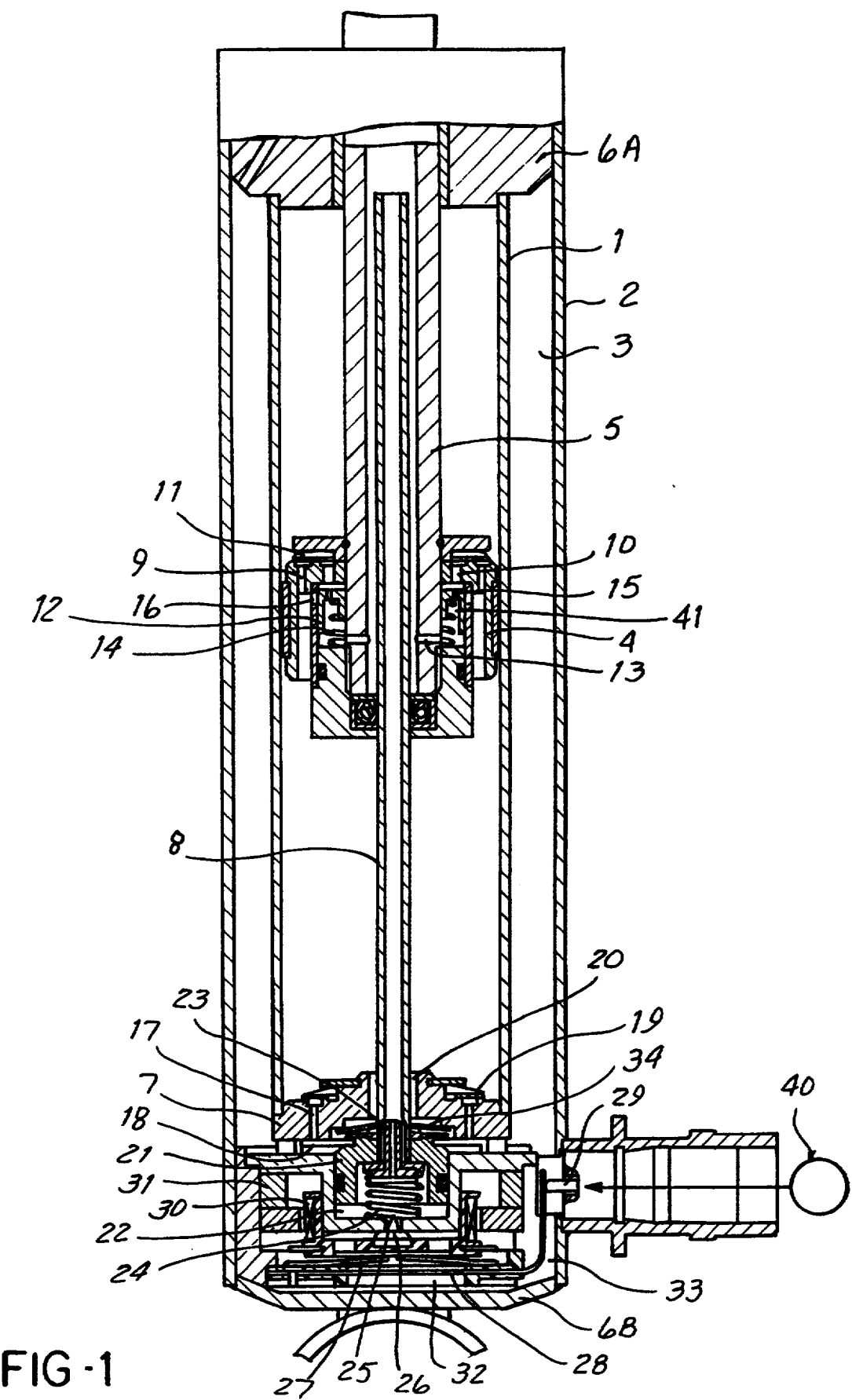
FIG. 1 is a cross-section view of a first embodiment.

The embodiment shown in FIG. 1, comprises an inner pipe forming the working cylinder 1, an outer pipe 2, and oil reservoir 3 situated between the inner and outer pipes, a piston 4 displaceable up and down in the working cylinder, a hollow piston rod 5, a top plate 6A and a bottom plate 6B which closes off the ends of the shock absorber, a disc 7 fitted at the bottom end of the working cylinder, a central pipe 8 projecting though the piston 4 and extending into the hollow piston rod 5, and damper valves regulated by a servomechanism which will be described further below.

Figure 1A:
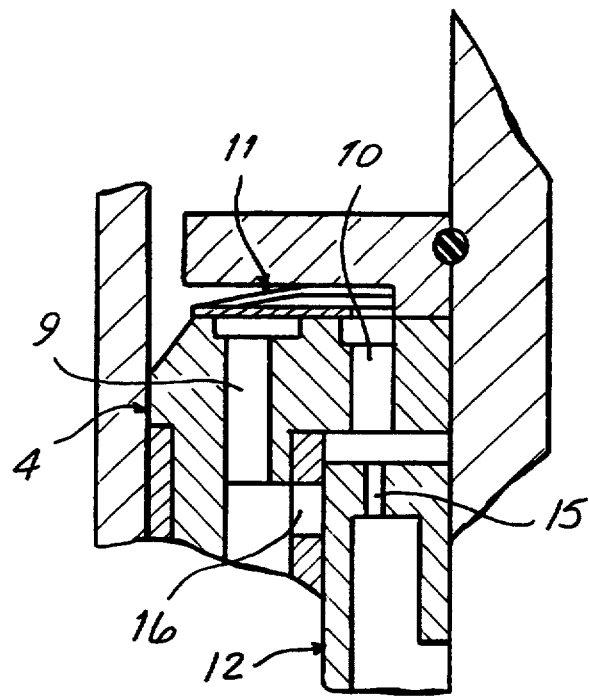
FIG. 1A is an enlarged fragmentary view of a section of the piston shown in FIG. 1.

An outer ring of bores 9 and an inner ring of bores 10 are fitted in the piston 4. The outer ring of bores 9 forms the connection between the spaces above and below the piston 4. This connection can be opened for upward oil flow (on inward stroke of the piston) by means of a non-return upflow valve 11. Upflow valve 11 covers the bores 9 when closed but is open over bores 10 as best seen in FIG. 1A.

A first damper valve in the form of a slide 12 for damping of the outward stroke is fitted in an annular space 41 in the piston 4. The space below the slide 12 is permanently connected to the cavity in the piston rod 5 by means of radial bores 13 in the piston rod wall. The inner ring of bores 10 in the piston 4 forms the connection between the space above the piston 4 and the space above the slide 12. The slide 12 is urged upwards by a spring 14 of limited pre-tensioning. A ring of narrow bores 15 is formed in the slide 12, aligned with the inner ring of bores 10 in the piston. Formed in the space below the outer ring of bores 9 are radial apertures 16 in the outer wall of the annular space 41 in which the slide 12 moves. Apertures 16 form the connection between the space above the slide 12 and the space below the bores 9 when the slide 12 is moved downwards.

The disc 7 contains a set of bores 17 forming the connection between the spaces above and below the disc 7. The space below the disc 7 is connected to the oil reservoir 3 by means of channels 18. A non-return upflow valve 19 is fitted at the top side of the disc 7.

The central pipe 8 projects with clearance through a central hole 20 in the disc 7 and at its bottom end is connected to a relay piston 21 which is displaceable in an exciting chamber 22. At the top side, the exciting chamber 22 is connected to the central pipe 8 by means of a narrow channel 23 in the relay piston 21. The relay piston 21 is urged upwards by a spring 24 resting on the bottom of the exciting chamber 22.

Figure 1B:
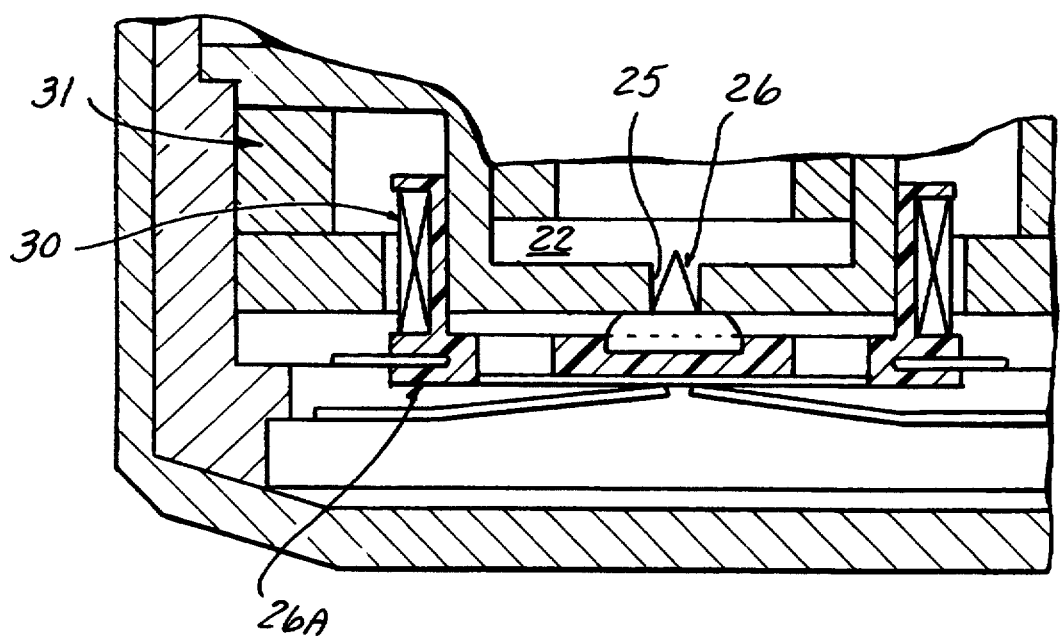
FIG. 1B is an enlarged fragmentary view of a section of the servo valve and associated elements.

An opening 25 is provided in the bottom of the exciting chamber 22, the passage of the opening being determined by the position of a valve body 26 of a servo valve. As best seen in FIG. 1B, the valve body 26 is mounted on a disc 26A, which is urged upwards by current-conducting leaf springs 27 which are electrically connected to an electric conductor 28 to a connection pin 29, and to a coil 30, which is placed on the disc 26A so that it can move up and down inside an axial permanent magnet 31. The connection pin 29 during operation forms the electrical connection to a control unit 40 which regulates the electric current to the coil depending on external parameters (for example, the frequency of movement of the non-sprung part of a car). Underneath the bottom of the exciting chamber 22 is a space 32 which is connected by means of one or more channels 33 to the oil reservoir 3.

A second damper valve 34 for the inward stroke is made in the form of pre-tensioned spring steel discs which can act on a seat on the bottom side of the disc 7.

In the case of an outward damper stroke, in which the piston 4 moves upwards, the shock absorber works as follows:

The shock absorber fluid flows through the bores 10 in the piston 4 to the top side of the first damper valve in the form of a slide 12. A small part of this fluid enters the space below the slide 12 through the 15 in the slide 12 and then flows through the radial bores 13 into the space between the central pipe 8 and the inside wall of the piston rod cavity to the central pipe 8. The low volume flow thus produced can be regulated by the servo valve body 26, the position of which can be adjusted by exciting the coil 30. If the servo valve body 26 is in the closed position, the pressure in the central pipe and below the slide 12 will rise to the outward damping pressure and the slide 12 will move upwards. The damping is maximum. If the servo valve body 26 is in the fully open position, the low volume flow will be able to move through the central pipe 8, the channel 23, the exciting chamber 22, the opening 25 in the bottom of the exciting chamber, the space 32 and the channel 33 to the oil reservoir 3. Little or no pressure builds up in the central pipe 8 and below the slide 12, so that the slide moves down against the slack spring 14 and opens the side apertures 16. The oil can now flow from the space above the piston 4 through the bores 10, the space above the slide 12 which has moved down, the side apertures 16 and through the annular space below the bores 9 and bores 9 to the space below the piston 4. The damping is determined by the pressure drop over the side apertures 16, and is minimal.

For each position of the servo valve body 26 between the fully open position and the fully closed position there is a position of the slide 12, and thus a pressure drop value across the side apertures 16. This last pressure drop value determines the pressure in the annular space above the piston 4, and thus the damping. It will be clear that with an upward moving piston 4, oil is replenished from the reservoir 3 through the channels 18, bores 17 and the upflow valve 19 in the space below the piston.

In the case of an inward damper stroke, oil will be displaced out of the space below the piston 4 through the bores 9 and the upflow valve 11 to the space above the piston 4, and a quantity of oil corresponding to the volume of the piston rod stroke will be displaced through the central hole 20, the second damper valve 34 and the channels 18 to the oil reservoir 3. Since the pressure above the piston 4 is equal to the pressure below the piston 4, a slight quantity of oil will again flow through the inner ring of bores 10, the bore 15 in the slide 12, the radial bores 13, the annular space between the central pipe 8 and the inner surface of the piston rod cavity to the central pipe 8, and from the central pipe 8, will reach the exciting chamber 22 through the channel 23. The pressure below the relay piston 21, and thus the pretensioning of the second damper valve 34, is regulated by regulating the pressure in the exciting chamber 22 with the aid of the position of the servo valve body 26 to be set by exciting the coil 13. The inward damping force is controlled directly in this way.

It will be clear that both the inward and the outward damping is regulated by regulating the position of a single servo valve body 26 by electrically exciting the coil 30 more or less. During inward and outward movement of the piston rod 5, oil flows to the exciting chamber 22 and the quantity thereof is determined by the damping pressure and the dimensions of the narrow bore 15 (restriction) in the slide 12.

The coil 30 is suspended by means of the disc 26A and leaf springs 27. The power lines of the permanent axial magnet 31 runs in such a way that the coil 30 is moved down or up more or less depending on the excitation causaused by means of the electrical connections 29, 28, 27. The servo valve body 26 is of such a shape that shutting off the exciting chamber 22 to a greater or lesser degree can be regulated accurately.

Figure 2:
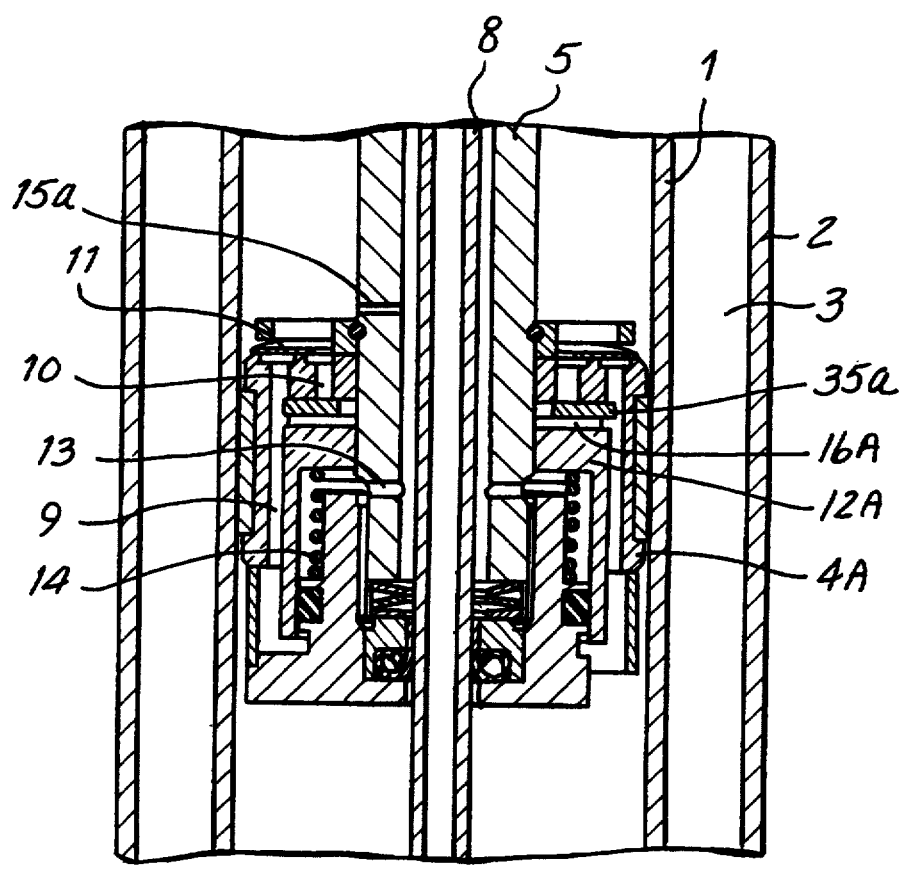
FIG. 2 is an enlarged cross-section view of a piston and adjacent cylinder portions of a second embodiment.

In FIG. 2 parts with equivalent functions are indicated by the same reference number. The slide 12A is no longer provided with a narrow bore, but the pressure equalization between the cylinder space above the piston 4A and the space below the slide 12A takes place through a bore or bores 15A in the piston rod 5A, the cavity in the piston rod 5A and the bores 13 in the piston rod 5A. The side channels 16A have such a large cross-section that they have no further influence on the damping. Fitted between the top side of the slide 12A and a part of the piston 4A is a first damper valve 35 comprised of a disc engaged by the top side of the slide 12A, the damping effect of which on flow is thus determined by the position of the slide 12A, which in turn is determined by the position of the servo valve body 26. The channels 16A form a permanent connection between the space below the damper valve 35 and the space below the outer ring holes 9. The damping of the outward stroke is determined by the pressure drop over the first damper valve 35.

The main advantages of the invention are:

The shock absorber works well even at very high piston speeds.

The central pipe 8 has a small cross-section and only small damper oil volumes (control volume flow) pass through this pipe (for example, 1 cc instead of 8 cc per 1 cm displacement), and consequently the cross-section dimensions of the piston rod 5 can be reduced to standard dimensions.

The damping characteristics for the inward and outward stroke can be controlled separately.

An additional advantage of the design shown is that the central pipe 8 is coupled to the relay piston 21, so that the guidance of the control pipe 8 is relieved of lateral forces and the relay piston is guided better, while tilting of the relay piston 21 is prevented.

The essential factor for the inventive idea is that both the damper valve fitted at the bottom end of the working cylinder for damping the inward stoke of the piston rod and the damper valve fitted in the piston for damping the outward stroke of the piston rod can be regulated by means of a single regulating mechanism.

The embodiments shown are merely examples. Different variants are possible. For example, instead of a slide 12 or the disc of the damper valve 35, other damper valve systems by which the regulating oil flow from the space above the piston to the exciting chamber can be regulated can be selected. Instead of the damper valve 34 shown, it is also possible to use a slide which can shut off, open or partially open one or more openings in the wall of a guide system. Different variants are also conceivable for the regulating mechanism.

I claim:

1. A twin-pipe shock absorber, comprising:
   an outer pipe; including a working cylinder disposed within said outer pipe, said working cylinder closed off at either end by respective top and bottom plates;
   a reservoir space between said working cylinder and said outer pipe;
   a piston displaceable within said working cylinder;
   one or more bores extending through said piston defining a flow path between a space above and a space below said piston in said working cylinder;
   a non-return upflow valve opening said one or more bores on the inward stroke of said piston receiving a displacement of oil from said space below said piston to said space above said piston;
   a hollow piston rod extending from the top side of said piston through said top plate of said working cylinder;
   a disc fitted between said piston and said bottom plate inside said working cylinder, having one or more bores establishing communication between said reservoir space and said space below said piston;
   a non-return upflow valve for regulation of the upgoing flow through said bores in said disc;
   a central pipe extending through said piston and spaced within said hollow piston rod and through said disc;
   limited flow passage means in said piston causing limited flow into said central pipe upon outward displacement of said piston in said working cylinder;
   a damping flow passage means in said piston allowing flow from said space above said piston to said space below said piston upon upward movement of said piston;
   a variable flow resistance first damper valve means interposed in a flow path fitted at the bottom end of said working cylinder between said space below said piston and said reservoir space; and,
   a variable flow resistance second damper valve means in said piston controlling the resistance to flow through said damping flow passage means in correspondence to said limited flow in said central pipe;
   a regulating mechanism below said first damper valve means regulating said resistance to flow of said first damper valve means and also controlling said limited flow in said control pipe to control said second damper valve means.

2. The twin-pipe shock absorber according to claim 1, wherein said regulating mechanism comprises a servomechanism having a relay piston, an exciting chamber receiving said relay piston, a connecting aperture adapted to be variably opened communicating with said reservoir, the extent of opening of said aperture determined by a servo valve including an electro-magnetically positioned valve body, said central pipe connected to said exciting chamber by a narrow bore in said relay piston of said servomechanism.

3. A twin-pipe shock absorber according to claim 2, wherein said central pipe is fixed at its bottom end to said relay piston of said servomechanism.

4. A twin-pipe shock absorber according to claim 2, wherein said valve body of said servo valve is connected to an electromagnetic coil movable up and down, and further including an axial permanent magnet receiving said movable coil, and a control unit means regulating electrical current to said coil.

5. A twin-pipe shock absorber according to claim 4, wherein said valve body of said servo valve is urged upwards by one or more leaf springs, said leaf springs comprising an electrical connection to said coil.

6. A twin-pipe shock absorber according to claim 2, wherein said second damper valve means comprises a slide, a annular space in said piston displaceably receiving said slide, said annular space defined by a wall having one or more side aperatures adapted to connect a space above said slide to said space below said piston, said piston having one or more holes connecting said space above said piston and said space above said slide, said slide having one or more bores forming a connection between said spaces above and below said slide, and that said space below said slide is permanently connected to said central pipe by means of one or more radial bores in said piston rod and a space between said hollow piston rod and said central pipe.

7. A twin-pipe shock absorber according to claim 2, wherein said second damper valve means comprises an annular space in said piston, said slide displaceable in said annular space, one or more side apertures in a wall of said annular space, said apertures permanently connecting a space below said second damper valve means to said space below said piston, said piston having one or more holes forming connections between said space above said piston and above said second damper valve means, and in that a space below said slide is connected to said central pipe by means of one or more radial bores in said piston rod and said central pipe.

8. A twin-pipe shock absorber according to claim 2, wherein said first damper valve means is comprised of pretensioned spring steel discs, the pretensioning of said spring steel discs controlled by said relay piston.

9. A shock absorber comprising:
an outer cylinder;
an inner working cylinder disposed within said outer cylinder with a space therebetween defining a reservoir for a damping fluid;
first end plate means closing off one end of said outer cylinder and said working cylinder;
second end plate means closing off the other end of said outer cylinder;
a disc fit into the other end of said working cylinder;
a piston slidably displaceable in said working cylinder defining a first space in said working cylinder between said piston and said first end plate means and a second space in said working cylinder between said piston and said disc;
a hollow piston rod fixed to said piston and extending from one side thereof through said first end plate means;
a first damper valve means in said disc allowing a variable resistance flow from said second space into said reservoir upon displacement of said piston towards said disc;
a central pipe extending within said hollow piston rod and said piston through said disc;
control valve means controllably communicating the interior of said central pipe with said reservoir;
a limited flow path receiving limited fluid flow from said first space and into said central pipe with said piston displaced towards said first end plate means;
a damping flow path in said piston allowing fluid flow from said first space to said second space when said piston is displaced towards said first end plate means;
a second damper valve means in said piston allowing a variable resistance to flow through said damping flow path upon displacement of said piston towards said one end of said working cylinder; and,
regulating means controlling said second damper valve means by control over said limited flow.

10. The shock absorber according to claim 9 wherein said regulating means further includes means also controlling said first damper valve means by said limited flow, whereby said first and second damper valve means are both controlled by control over said limited fluid flow.

11. The shock absorber according to claim 10 wherein said regulating means further comprises a servomechanism which includes servo valve means for controlling said limited fluid flow.

12. The shock absorber according to claim 11, wherein said regulating means includes an exciting chamber defined in said second end plate means, connecting said central pipe with said exciting chamber to receive said limited flow; said servo valve means comprising means controlling outflow from said exciting chamber to said reservoir.

13. The shock absorber according to claim 12 wherein said servo valve means includes an opening into said exciting chamber and a servo valve body variably positioned relative to said opening to control flow through said opening as a function of said relative position thereof; and electrical operating means variably positioning said servo valve body relative to said opening.

14. The shock absorber according claim 13 further including a relay piston slidable into said exciting chamber, said central pipe mounted in said relay piston and an internal passage in said relay piston connecting said central pipe with said exciting chamber, a clearance in said disc exerting fluid pressure in said second space on said first damper valve means, said first damper valve means operated by movement of said relay piston under the influence of said fluid pressure thereon, whereby outflow from said exciting chamber controls said first damper valve means.

15. The shock absorber according to claim 13 wherein said servo valve means includes leaf springs drivingly connected to said servo valve body and an electro-magnetic coil mounted to be movable with said valve body and leaf springs.

16. The shock absorber according to claim 11 wherein said second damper valve means comprises a slide movably mounted in said piston, and means varying said fluid flow resistance through said piston in correspondence to the position of said slide and means varying said slide position in accordance with said limited fluid flow.

17. The shock absorber according to claim 16 wherein said second damper means comprises a metering opening in said piston variably covered by said slide, a restricted opening through said slide communicating with said central pipe, said slide variably positioned by changes in pressure in said central pipe by variations in said limited flow.

18. The shock absorber according to claim 16 wherein said second damper means comprises a disc engaged by one side of said slide to exert a force thereon, the other side of said slide having the pressure in said central pipe exerted thereon to generate a variable force corresponding to said limited fluid flow.

* * * * *